(12) United States Patent
Gao et al.

(10) Patent No.: US 12,366,778 B2
(45) Date of Patent: Jul. 22, 2025

(54) DISPLAY MODULE WITHOUT VOLTAGE CONVERSION CHIP, MANUFACTURING METHOD THEREOF, AND ELECTRONIC TERMINAL

(71) Applicant: Shenzhen China Star Optoelectronics Semiconductor Display Technology Co., Ltd., Guangdong (CN)

(72) Inventors: Guoqing Gao, Guangdong (CN); Yunhai Bai, Guangdong (CN); Xinying Luo, Guangdong (CN); Jinao Chen, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 184 days.

(21) Appl. No.: 17/772,545

(22) PCT Filed: Apr. 15, 2022

(86) PCT No.: PCT/CN2022/087095
§ 371 (c)(1),
(2) Date: Apr. 28, 2022

(87) PCT Pub. No.: WO2023/184599
PCT Pub. Date: Oct. 5, 2023

(65) Prior Publication Data
US 2023/0333432 A1 Oct. 19, 2023

(30) Foreign Application Priority Data
Mar. 28, 2022 (CN) .......................... 202210312473.X (51) Int. Cl.
*G02F 1/1345* (2006.01)
*G02F 1/1335* (2006.01)

(52) U.S. Cl.
CPC .... *G02F 1/13452* (2013.01); *G02F 1/133514* (2013.01)

(58) Field of Classification Search
CPC ..................... G02F 1/134318; G02F 1/136213
See application file for complete search history.

(56) References Cited

U.S. PATENT DOCUMENTS

| | | | | |
|---|---|---|---|---|
| 2005/0219193 | A1* | 10/2005 | Nagaoka .............. | G09G 3/3674 345/98 |
| 2011/0012906 | A1* | 1/2011 | Kawase ................. | G09G 5/005 345/544 |
| 2015/0138471 | A1* | 5/2015 | Dong ................... | G02F 1/13306 257/59 |

FOREIGN PATENT DOCUMENTS

| | | | |
|---|---|---|---|
| CN | 103400563 A | 11/2013 | |
| CN | 2016-20387469 | * 5/2016 | ............... G09G 3/36 |

(Continued)

OTHER PUBLICATIONS

International Search Report in International application No. PCT/CN2022/087095, mailed on Dec. 29, 2022.

(Continued)

*Primary Examiner* — Lauren Nguyen
(74) *Attorney, Agent, or Firm* — PV IP PC; Christopher S. Ruprecht; Wei Te Chung (57) ABSTRACT

A display module, a manufacturing method thereof, and an electronic terminal are provided. The display module includes a circuit board and a display panel electrically connected to each other. The display panel includes an array substrate and a color filter substrate disposed opposite to each other. The array substrate includes a first common electrode and a second common electrode, and the color filter substrate includes a third common electrode. A first gamma pin of a digital power management integrated chip disposed on the circuit board is electrically connected to the (Continued)

first common electrode, the second common electrode, or the third common electrode.

19 Claims, 5 Drawing Sheets

(56) References Cited

FOREIGN PATENT DOCUMENTS

| | | | |
|---|---|---|---|
| CN | 108389556 | A | 8/2018 |
| CN | 110174787 | A | 8/2019 |
| CN | 112327530 | A | 2/2021 |
| CN | 113671761 | A | 11/2021 |
| CN | 113809136 | A | 12/2021 |
| JP | 2005242392 | A | 9/2005 |
| WO | 2015110030 | A1 | 7/2015 |

OTHER PUBLICATIONS

Written Opinion of the International Search Authority in International application No. PCT/CN2022/087095, mailed on Dec. 29, 2022.

* cited by examiner

DISPLAY MODULE WITHOUT VOLTAGE CONVERSION CHIP, MANUFACTURING METHOD THEREOF, AND ELECTRONIC TERMINAL

FIELD OF INVENTION

The present disclosure relates to the field of display technologies, more particularly, to the field of display panel manufacturing technologies, and specifically, to a display module, a manufacturing method thereof, and an electronic terminal.

BACKGROUND OF INVENTION

Liquid crystal displays (LCDs) have advantages of low cost, high resolution, and long service life, and are widely used.

Voltages for driving LCD panels to work mainly come from a digital power management integrated chip disposed on a circuit board. Limited by the design of the digital power management integrated chip, a voltage conversion chip generally needs to be independently disposed on the circuit board to generate common voltages for driving a part of common electrodes in the LCD panels to work, which causes a size of the circuit board to be larger and increases a cost of the circuit board.

Therefore, it is necessary to solve a problem of a high cost of circuit boards caused by voltage conversion chips being independently disposed in current LCD display modules.

Technical problem: an embodiment of the present disclosure provides a display module, a manufacturing method thereof, and an electronic terminal to solve a technical problem of the high cost of the circuit boards caused by the voltage conversion chips being independently disposed in current LCD display modules.

SUMMARY OF INVENTION

An embodiment of the present disclosure provides a display module, a manufacturing method thereof, and an electronic terminal to solve a problem of a high cost of circuit boards caused by voltage conversion chips being independently disposed in current LCD display modules.

An embodiment of the present disclosure provides a display module, which includes a circuit board and a display panel electrically connected to each other, wherein, the circuit board is provided with a digital power management integrated chip; the display panel includes an array substrate, a color filter substrate disposed opposite to the array substrate, and a liquid crystal layer disposed between the array substrate and the color filter substrate; the array substrate includes a plurality of sub-pixel units, a first common electrode, and a second common electrode; and the color filter substrate includes a third common electrode. Wherein, the sub-pixel units include:

a main sub-pixel unit including a first transistor and a main pixel electrode, wherein, the main pixel electrode is electrically connected to a data line by the first transistor, the main pixel electrode and the first common electrode form a first storage capacitor, and the main pixel electrode and the third common electrode form a first liquid crystal capacitor to drive liquid crystal molecules in the liquid crystal layer to deflect; and a sub sub-pixel unit including a second transistor, a third transistor, and a sub pixel electrode, wherein, the sub pixel electrode is electrically connected to the data line by the second transistor, and the second common electrode is electrically connected to the sub pixel electrode by the third transistor.

Wherein, the digital power management integrated chip includes a plurality of gamma pins, and the gamma pins include a first gamma pin, and the first gamma pin is electrically connected to the first common electrode, the second common electrode, or the third common electrode.

Beneficial effect: the present disclosure provides a display module, a manufacturing method thereof, and an electronic terminal. The display module includes a circuit board and a display panel electrically connected to each other. The circuit board is provided with a digital power management integrated chip; the display panel includes an array substrate, a color filter substrate disposed opposite to the array substrate, and a liquid crystal layer disposed between the array substrate and the color filter substrate; the array substrate includes a plurality of sub-pixel units, a first common electrode, and a second common electrode; and the color filter substrate includes a third common electrode. Wherein, the sub-pixel units include: a main sub-pixel unit including a first transistor and a main pixel electrode, wherein, the main pixel electrode is electrically connected to a data line by the first transistor, the main pixel electrode and the first common electrode form a first storage capacitor, and the main pixel electrode and the third common electrode form a first liquid crystal capacitor to drive liquid crystal molecules in the liquid crystal layer to deflect; and a sub sub-pixel unit including a second transistor, a third transistor, and a sub pixel electrode, wherein, the sub pixel electrode is electrically connected to the data line by the second transistor, and the second common electrode is electrically connected to the sub pixel electrode by the third transistor. Wherein, the digital power management integrated chip includes a plurality of gamma pins, and the gamma pins include a first gamma pin, and the first gamma pin is electrically connected to the first common electrode, the second common electrode, or the third common electrode. In the present disclosure, by electrically connecting the first gamma pin of the digital power management integrated chip to the first common electrode AVCOM, the second common electrode SHBVCOM, or the third common electrode CVCOM, that is, using a spare gamma pin of the digital power management integrated chip to load a corresponding voltage to one of the three common electrodes, utilization of the gamma pins of the digital power management integrated chip can be improved in one aspect. In another aspect, it can prevent a voltage conversion chip, which generates voltages to drive the first common electrode AVCOM, the second common electrode SHBVCOM, or the third common electrode CVCOM in the display panel to work, from being independently disposed on the circuit board, thereby further reducing a size and cost of the circuit board.

DESCRIPTION OF DRAWINGS

The present disclosure will be further described with the accompanying drawings. It should be noted that the accompanying figures described below are only part of the embodiments of the present disclosure, from which those skilled in the art can derive further figures without making any inventive efforts.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

The terms "first", "second", and the like in the present disclosure are used to distinguish different objects, and are not used to describe a specific order. In addition, the term "comprises", "have", and their variations are intended to cover a non-exclusive inclusion. For example, a process, method, system, product, or device that includes a series of steps or modules is not limited to the listed steps or modules, but optionally includes steps or modules that are not listed, or optionally also includes other steps or modules inherent to the process, method, product, or device.

Reference to an "embodiment" in the present disclosure means that a particular feature, structure, or characteristic described in connection with the embodiment may be included in at least one embodiment of the present disclosure. The appearances of a phrase in various places in the specification are not necessarily all referring to the same embodiment, nor a separate or alternative embodiment that is mutually exclusive with other embodiments. It can be explicitly and implicitly understood by those skilled in the art that the embodiments described herein may be combined with other embodiments.

An embodiment of the present disclosure provides a display module. The display module includes, but is not limited to, the following embodiments and combinations thereof.

Figure 1:
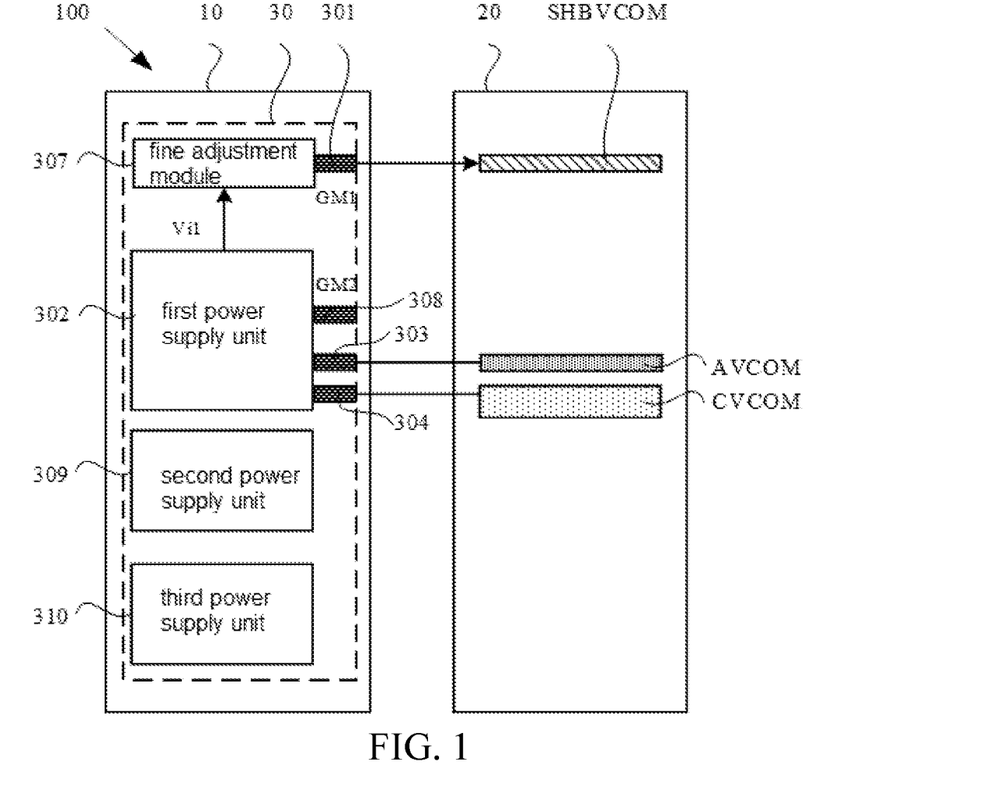
FIG. 1 is a first schematic structural block diagram of a display module according to an embodiment of the present disclosure.
Figure 2:
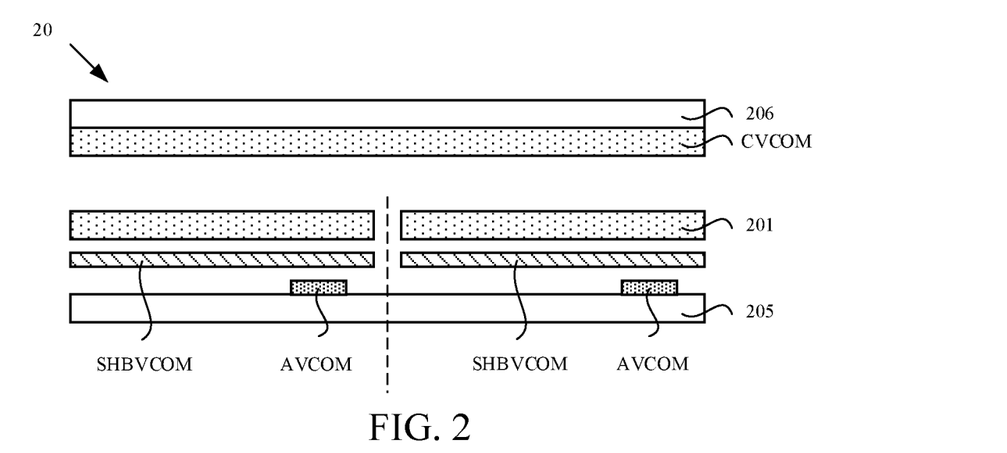
FIG. 2 is a schematic cross-sectional diagram of a partial structure of a display panel according to an embodiment of the present disclosure.

In an embodiment, as shown in FIG. 1, the display module 100 includes a circuit board 10 and a display panel 20 electrically connected to each other. The circuit board 10 is provided with a digital power management integrated chip 30. The display panel 20 includes an array substrate, a color filter substrate disposed opposite to the array substrate, and a liquid crystal layer disposed between the array substrate and the color filter substrate. As shown in FIG. 2, the array substrate includes a plurality of sub-pixel units 201, a first common electrode AVCOM, and a second common electrode SHBVCOM. The color filter substrate includes a third common electrode CVCOM. In conjunction with FIGS. 2 and 3, the sub-pixel units 201 include: a main sub-pixel unit 2011, which includes a first transistor T1 and a main pixel electrode MP, wherein, the main pixel electrode MP is electrically connected to a data line D by the first transistor T1, the main pixel electrode MP and the first common electrode AVCOM form a first storage capacitor Cst1, and the main pixel electrode MP and the third common electrode CVCOM form a first liquid crystal capacitor Clc1 to drive liquid crystal molecules in the liquid crystal layer to deflect; and a sub sub-pixel unit 2012, which includes a second transistor T2, a third transistor T3, and a sub pixel electrode SP, wherein, the sub pixel electrode SP is electrically connected to the data line D by the second transistor T2, and the second common electrode SHBVCOM is electrically connected to the sub pixel electrode SP by the third transistor T3. In conjunction with FIGS. 1 to 3, the digital power management integrated chip 30 includes a plurality of gamma pins, and the gamma pins include a first gamma pin 301, and the first gamma pin 301 is electrically connected to the first common electrode AVCOM, the second common electrode SHBVCOM, or the third common electrode CVCOM.

Specifically, as shown in FIG. 2, the array substrate may include a first substrate 205 carrying the sub-pixel units 201, the first common electrode AVCOM, and the second common electrode SHBVCOM, and the first common electrode AVCOM, the second common electrode SHBVCOM, and the sub-pixel units 201 may be sequentially disposed on the first substrate 205. A plurality of transistors corresponding to the sub-pixel units 201 by one-to-one may also be disposed on the array substrate, and each sub-pixel unit 201 may be electrically connected to a corresponding transistor. Further, the first common electrode AVCOM may be disposed on a same layer as a gate electrode layer of a corresponding transistor, and the second common electrode SHBVCOM may be disposed on a same layer as an active layer of the corresponding transistor. The color filter substrate may include a second substrate 206 carrying the third common electrode CVCOM, and a filter layer may also be disposed between the second substrate 206 and the third common electrode CVCOM to realize color display.

Figure 3:
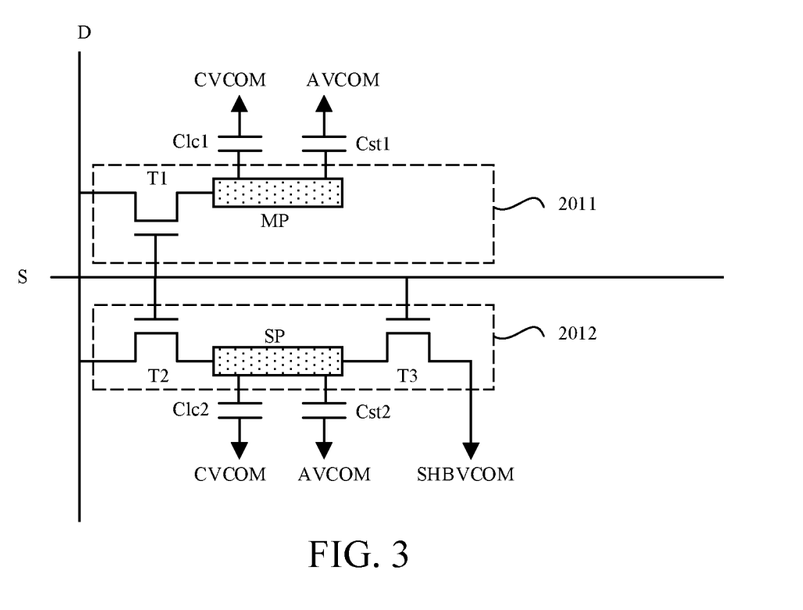
FIG. 3 is an equivalent circuit diagram of sub-pixel units according to an embodiment of the present disclosure.

Wherein, in this embodiment, specific positions of the first common electrode AVCOM, the second common electrode SHBVCOM, and the third common electrode CVCOM are not limited, as long as the first common electrode AVCOM and the main pixel electrode MP are overlapped in the three-dimensional space to form the first storage capacitor Cst1, the third common electrode CVCOM and the main pixel electrode MP are overlapped in the three-dimensional space to form the first liquid crystal capacitor Clc1, and the second common electrode SHBVCOM is electrically connected to the third transistor T3. Further, the sub pixel electrode SP and the first common electrode AVCOM also form a second storage capacitor Cst2, and the sub pixel electrode SP and the third common electrode CVCOM also form a second liquid crystal capacitor Clc2 to drive the liquid crystal molecules in the liquid crystal layer to deflect.

Specifically, after a gate voltage on a gate line S controls the first transistor T1, the second transistor T2, and the third transistor T3 to be turned on, a data voltage on the data line D can be loaded to the main pixel electrode MP and the sub pixel electrode SP to charge the first storage capacitor Cst1, the first liquid crystal capacitor Clc1, the second storage capacitor Cst2, and the second liquid crystal capacitor Clc2. At a same time, compared to the main pixel electrode MP, a voltage of the sub pixel electrode SP can be obtained by dividing the data voltage on the data line D and a voltage on the second common electrode SHBVCOM by the second transistor T2 and the third transistor T3. That is, the voltage of the sub pixel electrode SP is different from a voltage of the main pixel electrode MP which is similar to the data voltage on the data line, thereby improving viewing angles. In a later stage, when the first liquid crystal capacitor Clc1 leaks electricity, the first storage capacitor Cst1 can charge the first liquid crystal capacitor Clc1 to relieve a voltage drop of the main pixel electrode MP. Similarly, the second storage capacitor Cst2 can charge the second liquid crystal capacitor Clc2 to relieve a voltage drop of the sub pixel electrode SP. Further, a capacitance of the first storage capacitor Cst1 may be greater than a capacitance of the first liquid crystal capacitor Clc1, and a capacitance of the second storage capacitor Cst2 may be greater than a capacitance of the second liquid crystal capacitor Clc2, thereby better maintaining the voltage of the main pixel electrode MP and the voltage of the sub pixel electrode SP. In combination with the above discussion, in this embodiment, a voltage on the first common electrode AVCOM, the voltage on the second common electrode SHBVCOM, and a voltage on the third common electrode CVCOM may be same or different.

Specifically, this embodiment may be applied to, but is not limited to, the display module 100 that complies with the CEDS protocol or the USIT protocol, as long as the digital power management integrated chip 30 in the display module 100 has at least one gamma pin that is not electrically connected to a source driver chip. It can be understood that in this embodiment, by electrically connecting the first gamma pin 301 of the digital power management integrated chip 30 to the first common electrode AVCOM, the second common electrode SHBVCOM, or the third common electrode CVCOM, that is, using a spare gamma pin of the digital power management integrated chip 30 to load a corresponding voltage to one of the three common electrodes, utilization of the gamma pins of the digital power management integrated chip 30 can be improved in one aspect. In another aspect, it can prevent a voltage conversion chip, which generates voltages to drive the first common electrode AVCOM, the second common electrode SHBVCOM, or the third common electrode CVCOM in the display panel 20 to work, from being independently disposed on the circuit board 10, thereby further reducing a size and cost of the circuit board 10.

Particularly, as shown in Table 1, it includes a temperature T of the digital power management integrated chip 30, a root mean square value Irms of an output current of all pins of the digital power management integrated chip 30, a maximum value Imax of the output current of all pins of the digital power management integrated chip 30, and a ripple value ripple of an output voltage of all pins of the digital power management integrated chip 30 corresponding to a method 1 of independently disposing the voltage conversion chip on the circuit board 10 and a method 2 of using the first gamma pin 301. Specifically, the temperature T of the digital power management integrated chip 30 using the method 2 of the present disclosure is raised compared to the method 1, but is lower than the temperature specification of the digital power management integrated chip 30, 85° C., so the digital power management integrated chip 30 can withstand. The root mean square value Irms of the output current of all pins of the digital power management integrated chip 30 using the method 2 of the present disclosure is basically same as that using the method 1. The maximum value Imax of the output current of all pins of the digital power management integrated chip 30 using the method 2 of the present disclosure is reduced compared to that using the method 1, thereby reducing a risk of burning any of the pins. The ripple value ripple of the output voltage of all pins of the digital power management integrated chip 30 using the method 2 of the present disclosure is less than that using the method 1, thereby improving stability of an output voltage of any of the pins. Therefore, combined with the above discussion, it can be considered that the method 2 of the present disclosure is feasible.

TABLE 1

|  | method 1 | method 2 |
| --- | --- | --- |
| T/° C. | 80° C. | 82.8° C. |
| Irms/A | 18.93 | 19.29 |
| Imax/A | 49.2 | 26.79 |
| ripple | 74.4 | 53.6 |

In an embodiment, in conjunction with FIGS. 1 to 3, the digital power management integrated chip 30 includes a first power supply unit 302, and the first power supply unit 302 is electrically connected to the second common electrode SHBVCOM by the first gamma pin 301. Specifically, the first power supply unit 302 may be electrically connected to a plurality of the gamma pins to output a corresponding gamma voltage to each gamma pin. That is, each gamma pin may have a corresponding gamma voltage, and in this embodiment, one of the gamma pins may be selected as the first gamma pin 301 to be electrically connected to the second common electrode SHBVCOM. Specifically, in conjunction with FIGS. 1 to 3, the digital power management integrated chip 30 further includes a plurality of common electrode pins, and the common electrode pins include a first common electrode pin 303 and a second common electrode pin 304. The first power supply unit 302 is electrically connected to the first common electrode AVCOM by the first common electrode pin 303, and the first power supply unit 302 is electrically connected to the third common electrode CVCOM by the second common electrode pin 304.

Wherein, in this embodiment, the voltage on the first common electrode AVCOM, the voltage on the second common electrode SHBVCOM, and the voltage on the third common electrode CVCOM may be different. For example, the voltage on the first common electrode AVCOM may be 6.3 volts, the voltage on the second common electrode SHBVCOM may be 8.68 volts, and the voltage on the third common electrode CVCOM may be 5.6 volts. Specifically, in this embodiment, a first common voltage loaded to the first common electrode AVCOM and a third common voltage loaded to the third common electrode CVCOM can be generated by the first power supply unit 302, that is, it can be considered that the first power supply unit 302 can stably generate the first common voltage and the third common voltage. However, due to the requirements of stability, it is generally necessary to independently dispose the voltage conversion chip on the circuit board 10 to generate a second common voltage that drives the second common electrode SHBVCOM, thereby increasing the cost of the circuit board 10 and the display module 100.

It can be understood that in this embodiment, the first power supply unit 302 applies corresponding voltages to the first common electrode AVCOM and the third common electrode CVCOM by the first common electrode pin 303 and the second common electrode pin 304, respectively, and the spare gamma pin of the plurality of gamma pins electrically connected to the first power supply unit 302 is used as the first gamma pin 301 to apply the corresponding voltage to the second common electrode SHBVCOM, so the utilization of the gamma pins can be improved while preventing from independently disposing the voltage conversion chip configured to generate the voltage that drives the second common electrode SHBVCOM, thereby reducing the size and cost of the circuit board 10.

In an embodiment, in conjunction with FIGS. 1 to 3, the digital power management integrated chip 30 further includes a fine adjustment module 07 electrically connecting the first power supply unit 302 to the first gamma pin 301. The fine adjustment module 307 has a first input voltage Vi1, the first gamma pin 301 outputs a first gamma voltage GM1, and an absolute value of a difference between the first input voltage Vi1 and a preset voltage is greater than an absolute value of a difference between the first gamma voltage GM1 and the preset voltage. Specifically, the first input voltage Vi1 and voltages output by other gamma pins different from the first gamma pin 301 can all be generated by the first power supply unit 302. Further, in this embodiment, the first input voltage Vi1 generated by the first power supply unit 302, which should be directly output by the first gamma pin 301 originally, is applied to the fine adjustment module 307, and the first gamma voltage GM1 generated by the fine adjustment module 307 is output to the first gamma pin 301. The preset voltage may be understood as a voltage value theoretically required for the second common electrode SHBVCOM to maintain normal operation of the display panel 20.

It can be understood that in this embodiment, by applying the first input voltage Vi1 generated by the first power supply unit 302 to the fine adjustment module 307 and adjusting the first input voltage Vi1 to be the first gamma voltage GM1 that has a value closer to the preset voltage, that is, based on the first power supply unit 302 and further combining the adjustment of the fine adjustment module 307, compared to the first input voltage Vi1 generated by the first power supply unit 302, the first gamma voltage GM1 transmitted to the second common electrode SHBVCOM by the first gamma pin 301 has a value closer to the voltage value theoretically required for the second common electrode SHBVCOM to maintain the normal operation of the display panel 20, thereby improving working reliability of the display panel 20. Wherein, an appropriate first gamma voltage GM1 may be set by adjusting parameters related to the fine adjustment module 307. Of course, on the basis of omitting the fine adjustment module 307, reasonable parameters may be set by trial and error to allow the first gamma pin 301 to have a voltage close to or equal to the preset voltage and allow voltages output by other gamma pins to satisfy corresponding functional requirements.

In an embodiment, in conjunction with FIGS. 1 to 3, the digital power management integrated chip 30 further includes a second gamma pin 308, which is electrically connected to the first power supply unit 302, and the second gamma pin 308 has a second gamma voltage GM2. Wherein, an absolute value of a difference between the first input voltage Vi1 and the first gamma voltage GM1 is less than an absolute value of a difference between the second gamma voltage GM2 and the first gamma voltage GM1. Specifically, in combination with the above discussion, even though the first input voltage Vi1 generated by the first power supply unit 302 is adjusted to the first gamma voltage GM1 that is closer to the preset voltage after being input to the fine adjustment module 307, compared with the second gamma voltage GM2 of the second gamma pin 308, the first input voltage Vi1 before adjusted to the first gamma voltage GM1 is also closer to the first gamma voltage GM1. It can be understood that in combination with the above discussion, in this embodiment, under a same adjustment performance of the fine adjustment module 307, compared to that the second gamma voltage GM2 having a larger absolute value of the difference from the first gamma voltage GM1 is used as an input voltage of the fine adjustment module 307, using the first input voltage Vi1 which has a smaller absolute value of the difference from the first gamma voltage GM1 as the input voltage of the fine adjustment module 307 can further helps that the voltage transmitted to the second common electrode SHBVCOM be close to or equal to the voltage value theoretically required for the second common electrode SHBVCOM to maintain the normal operation of the display panel 20. Therefore, the working reliability of the display panel 20 can be improved.

Further, as shown in FIG. 1, the digital power management integrated chip 30 may further include a second power supply unit 309 and a third power supply unit 310. The second power supply unit 309 may be electrically connected to a gate driving circuit disposed in the display panel 20 to provide a plurality of clock signals and a plurality of constant voltage signals to the gate driving circuit, and the third power supply unit 310 may be electrically connected to a source driving circuit and a timing control chip to provide a plurality of constant voltage signals to the source driving circuit and to transmit a plurality of constant voltage signals to the timing control chip. Wherein, the source driving circuit may electrically connect the circuit board 10 to the display panel 20, and the timing control chip may be disposed on the circuit board 10. Specifically, the timing control chip may also be electrically connected to the gate driving circuit and the source driving circuit. In combination with the above discussion, the digital power management integrated chip 0 may provide the display panel 20 with working voltages, and based on this, the timing control chip may control the display panel 20 to perform corresponding work. Specifically, the first power supply unit 302, the second power supply unit 309, the third power supply unit 310, the fine adjustment module 307, and a voltage conversion module 313 mentioned above may form a circuit structure or be integrated into corresponding chips.

Figure 4:
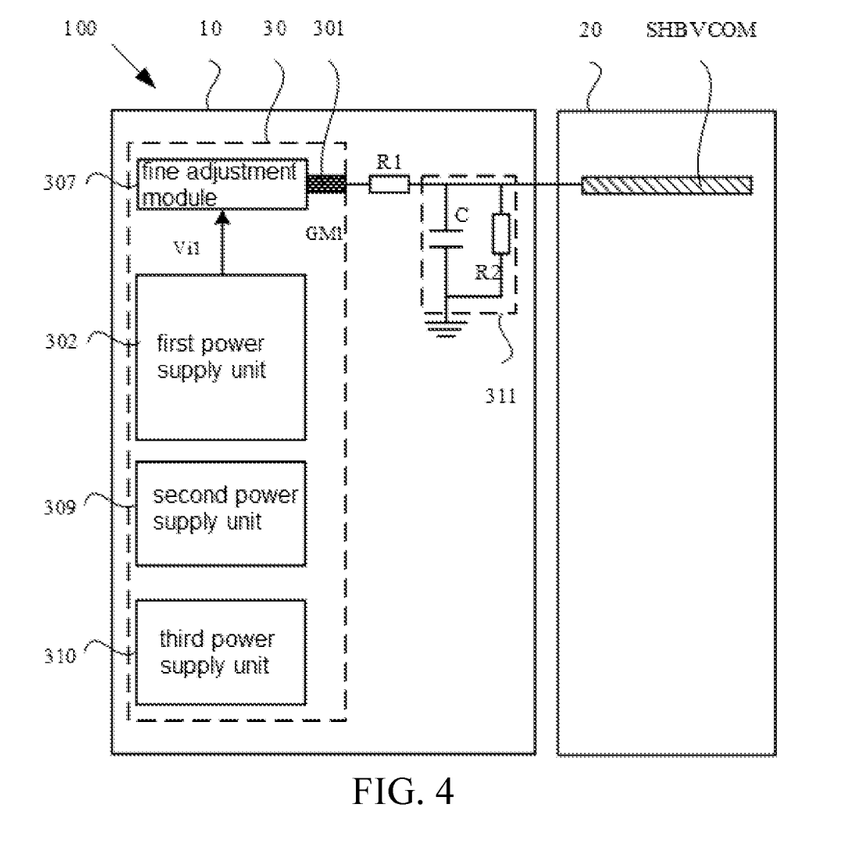
FIG. 4 is a second schematic structural block diagram of the display module according to an embodiment of the present disclosure.

In an embodiment, as shown in FIG. 4, the circuit board 10 is further provided with a filtering module 311 electrically connecting the first gamma pin 301 to the second common electrode SHBVCOM. Wherein, in this embodiment, a specific structure of the filtering module 311 is not limited. The filtering module 311 may be an active filter or a passive filter. The passive filter may at least include a capacitor, and may also include at least one of an inductor or a resistor. Further, a first resistor R1 may be connected in series between the filtering module 311 and the first gamma pin 301 to control a magnitude of the current flowing into the second common electrode SHBVCOM. Specifically, the filtering module 311 including a capacitor C and a second resistor R2 arranged in parallel to each other is taken as an example for description. When a voltage of a node of the first resistor R1 and the capacitor C is higher than a capacitance voltage, the capacitor C charges, and when the voltage of the node of the first resistor R1 and the capacitor C is lower than the capacitance voltage, the capacitor C discharges, so in the processes of charging and discharging, the voltage loaded to the second common electrode SHBVCOM is basically stable. The second resistor R2 may pull down the voltage applied to the second common electrode SHBVCOM, thereby further stabilizing the voltage applied to the second common electrode SHBVCOM.

Figure 5:
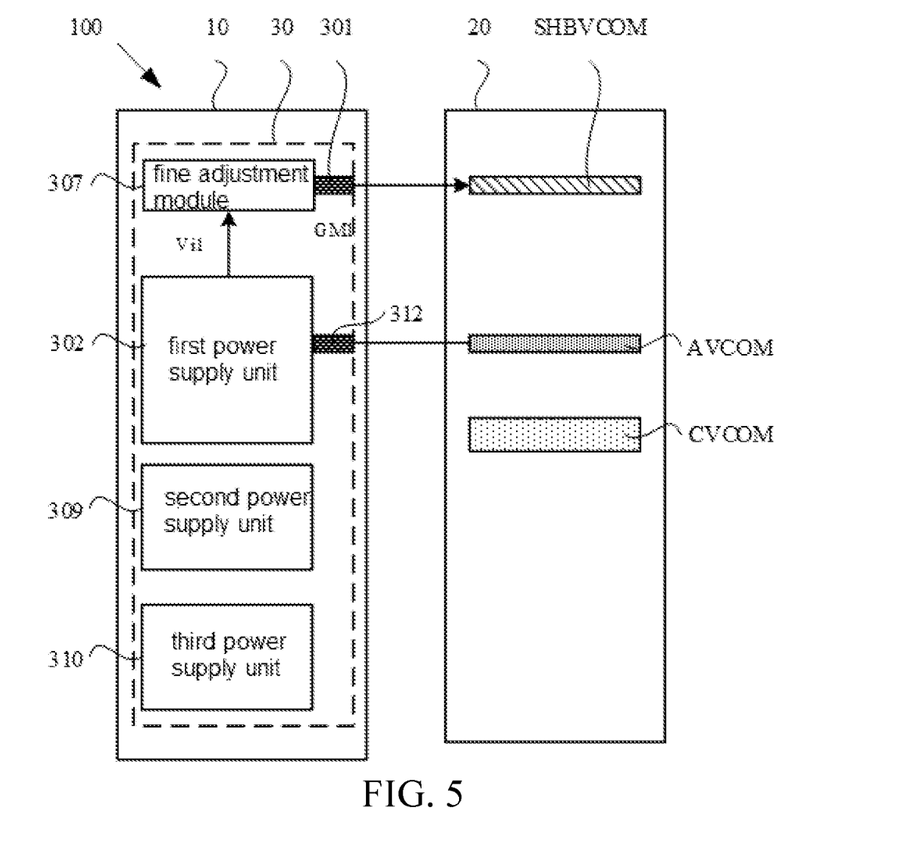
FIG. 5 is a third schematic structural block diagram of the display module according to an embodiment of the present disclosure.

In an embodiment, as shown in FIG. 5, the digital power management integrated chip 30 further includes a third gamma pin 312 electrically connecting one of the first common electrode AVCOM or the third common electrode CVCOM to the first power supply unit 302. Specifically, in combination with the above discussion, the first gamma pin 301 and the third gamma pin 312 may be understood as the gamma pins that are not electrically connected to the source driver chip, that is, spare gamma pins. That is, based on the first gamma pin 301 being electrically connected to the second common electrode SHBVCOM, in this embodiment, another spare gamma pin is further used as the third gamma pin 312, and the first power supply unit 302 may also apply voltages to one of the first common electrode AVCOM or the third common electrode CVCOM by the third gamma pin 312.

It can be understood that based on the first gamma pin 301 being electrically connected to the second common electrode SHBVCOM, in this embodiment, by electrically connecting the third gamma pin 312 of the digital power management integrated chip 30 to the first common electrode AVCOM or the third common electrode CVCOM, that is, using another spare gamma pin of the digital power management integrated chip 30 to load a corresponding voltage to one of the two common electrodes, the utilization of the gamma pins of the digital power management integrated chip 30 can be improved in one aspect. In another aspect, it can prevent from independently disposing a module configured to generate the voltage that drives the first common electrode AVCOM or the third common electrode CVCOM in the display panel 20 to work, in the first power supply unit 302, thereby further reducing the cost of the digital power management integrated chip 30.

Figure 6:
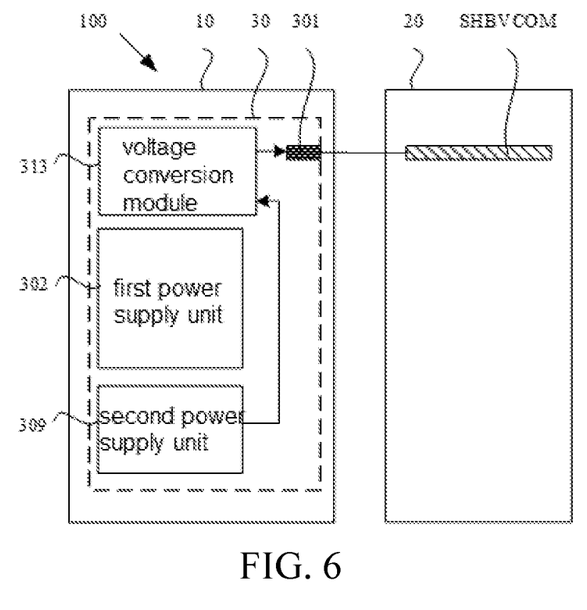
FIG. 6 is a fourth schematic structural block diagram of the display module according to an embodiment of the present disclosure.

In an embodiment, as shown in FIG. 6, the digital power management integrated chip 30 further includes a second power supply unit 309 and the voltage conversion module 313, and the voltage conversion module 313 electrically connects the second power supply unit 309 to the first gamma pin 301. Specifically, in combination with the above discussion, the second power supply unit 309 may generate multiple constant voltage signals, and the voltage conversion module 313 may process one of the constant voltage signals generated by the second power supply unit 309 to form a signal loaded to the second common electrode SHBVCOM. Similarly, in conjunction with the description of the first input voltage Vi1 and the fine adjustment module 307, in this embodiment, it can be understood that a voltage value of a signal loaded to the voltage conversion module 313 may have a minimum difference from the preset voltage. Further, a voltage value of the signal loaded to the second common electrode SHBVCOM generated by the action of the voltage conversion module 313 may be similar to or equal to the preset voltage. Wherein, in combination with a magnitude relationship between the voltage value of the signal loaded to the voltage conversion module 313 and the preset voltage, the voltage conversion module 313 may be set as a boost circuit or a buck circuit.

An embodiment of the present disclosure provides a manufacturing method of the display module. The method includes, but is not limited to, the following embodiments and combinations thereof.

In an embodiment, in conjunction with FIGS. 1 to 3 and based on the display panel 20 mentioned above, the method includes, but is not limited to, the following steps and combinations thereof.

Step S1: providing the circuit board and the display panel mentioned above, wherein, the circuit board is provided with the digital power management integrated chip, the digital power management integrated chip includes a plurality of gamma pins, and each of the gamma pins outputs a corresponding gamma voltage.

Specifically, the gamma pins in this embodiment may be electrically connected to the first power supply unit 302, that is, the corresponding gamma voltage output by each gamma pin may be generated by the first power supply unit 302. It should be noted that gamma voltages herein are different from the first gamma voltage GM1 output by the fine adjustment module 307 mentioned above, that is, each gamma voltage is determined only by the first power supply unit 302.

Step S2: determining a gamma pin corresponding to a gamma voltage having a minimum absolute value of the difference from the preset voltage to be the first gamma pin.

Specifically, the first power supply unit 302 can generate different gamma voltages, and similar to the description above, the preset voltage may be understood as the voltage value theoretically required for the first common electrode AVCOM, the second common electrode SHBVCOM, or the third common electrode CVCOM to maintain normal operation of the display panel 20. That is, in this embodiment, among the multiple gamma pins, the gamma pin corresponding to the gamma voltage closest to the preset voltage may be selected as the first gamma pin, and not any gamma pins can be used as the first gamma pin.

Step S3: electrically connecting the first gamma pin to the first common electrode, the second common electrode, or the third common electrode.

It can be understood that in this embodiment, by electrically connecting the first gamma pin 301 of the digital power management integrated chip 30 to the first common electrode AVCOM, the second common electrode SHBVCOM, or the third common electrode CVCOM, that is, using the spare gamma pin of the digital power management integrated chip 30 to load the corresponding voltage to one of the three common electrodes, utilization of the gamma pins of the digital power management integrated chip 30 can be improved in one aspect. In another aspect, it can prevent the voltage conversion chip, which generates voltages to drive the first common electrode AVCOM, the second common electrode SHBVCOM, or the third common electrode CVCOM in the display panel 20 to work, from being independently disposed on the circuit board 10, thereby further reducing the size and cost of the circuit board 10. In addition, in this embodiment, the gamma voltage output by the first gamma pin is closest to the preset voltage, thereby further improving the working reliability of the display panel 20.

An embodiment of the present disclosure provides an electronic terminal, which includes the display module mentioned above.

The embodiments of the present disclosure provide the display module, the manufacturing method thereof, and the electronic terminal. The display module includes the circuit board and the display panel electrically connected to each other, wherein, the circuit board is provided with the digital power management integrated chip; the display panel includes the array substrate, the color filter substrate disposed opposite to the array substrate, and the liquid crystal layer disposed between the array substrate and the color filter substrate; the array substrate includes the plurality of sub-pixel units, the first common electrode, and the second common electrode; and the color filter substrate includes the third common electrode. Wherein, the sub-pixel units include: the main sub-pixel unit including the first transistor and the main pixel electrode, wherein, the main pixel electrode is electrically connected to the data line by the first transistor, the main pixel electrode and the first common electrode form the first storage capacitor, and the main pixel electrode and the third common electrode form the first liquid crystal capacitor to drive the liquid crystal molecules in the liquid crystal layer to deflect; and the sub sub-pixel unit including the second transistor, the third transistor, and the sub pixel electrode, wherein, the sub pixel electrode is electrically connected to the data line by the second transistor, and the second common electrode is electrically connected to the sub pixel electrode by the third transistor. Wherein, the digital power management integrated chip includes the plurality of gamma pins, and the gamma pins include the first gamma pin, and the first gamma pin is electrically connected to the first common electrode, the second common electrode, or the third common electrode. In the present disclosure, by electrically connecting the first gamma pin of the digital power management integrated chip to the first common electrode AVCOM, the second common electrode SHBVCOM, or the third common electrode CVCOM, that is, using the spare gamma pin of the digital power management integrated chip to load the corresponding voltage to one of the three common electrodes, utilization of the gamma pins of the digital power management integrated chip can be improved in one aspect. In another aspect, it can prevent the voltage conversion chip, which generates voltages to drive the first common electrode AVCOM, the second common electrode SHBVCOM, or the third common electrode CVCOM in the display panel to work, from being independently disposed on the circuit board, thereby further reducing the size and cost of the circuit board.

The display module, the manufacturing method thereof, and the electronic terminal provided by the embodiments of the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A display module, comprising a circuit board and a display panel electrically connected to each other via a source driving circuit, wherein the circuit board is provided with a digital power management integrated chip; the display panel comprises an array substrate, a color filter substrate disposed opposite to the array substrate, and a liquid crystal layer disposed between the array substrate and the color filter substrate;

the array substrate comprises a plurality of sub-pixel units, a first common electrode, and a second common electrode; and the color filter substrate comprises a third common electrode;

wherein the sub-pixel units comprise:

a main sub-pixel unit comprising a first transistor and a main pixel electrode, wherein the main pixel electrode is electrically connected to a data line by the first transistor, a first storage capacitor is formed between the main pixel electrode and the first common electrode, and a first liquid crystal capacitor is formed between the main pixel electrode and the third common electrode to drive liquid crystal molecules in the liquid crystal layer to deflect; and a sub sub-pixel unit comprising a second transistor, a third transistor, and a sub pixel electrode, wherein the sub pixel electrode is electrically connected to the data line by the second transistor, and the second common electrode is electrically connected to the sub pixel electrode by the third transistor;

wherein the digital power management integrated chip comprises:

a plurality of gamma pins, and the gamma pins comprise a first gamma pin, wherein the first gamma pin is a spare gamma pin of the digital power management integrated chip that is not electrically connected to the source driving circuit, and the first gamma pin is electrically connected to the the second common electrode, a first power supply unit electrically connected to the gamma pins and configured to generate corresponding input voltages, and the first power supply unit is electrically connected to the second common electrode by the first gamma pin;

a plurality of common electrode pins, the plurality of common electrode pins comprise a first common electrode pin and a second common electrode pin, the first power supply unit is electrically connected to the first common electrode by the first common electrode pin, and the first power supply unit is electrically connected to the third common electrode by the second common electrode pin; and a fine adjustment module electrically connected between the first power supply unit and the first gamma pin, wherein the fine adjustment module is configured to receive a first input voltage generated by the first power supply unit, adjust the first input voltage to a first gamma voltage, and output the first gamma voltage to the first gamma pin;

wherein the first gamma pin outputs the first gamma voltage to the second common electrode wherein the first gamma voltage that is output by the fine adjustment module via the first gamma pin has a value that is relatively closer to a preset voltage for the second common electrode than the first input voltage generated by the first power supply unit.

2. The display module according to claim 1, wherein the digital power management integrated chip further comprises:

a second gamma pin electrically connected to the first power supply unit and outputting a second gamma voltage, wherein an absolute value of a difference between the first input voltage and the first gamma voltage is less than an absolute value of a difference between the second gamma voltage and the first gamma voltage.

3. The display module according to claim 1, wherein the circuit board is further provided with a filtering module electrically connecting the first gamma pin to the second common electrode.

4. The display module according to claim 1, wherein the digital power management integrated chip further comprises:

a third gamma pin electrically connecting one of the first common electrode or the third common electrode to the first power supply unit.

5. A display module, comprising a circuit board and a display panel electrically connected to each other via a source driving circuit, wherein the circuit board is provided with a digital power management integrated chip; the display panel comprises an array substrate, a color filter substrate disposed opposite to the array substrate, and a liquid crystal layer disposed between the array substrate and the color filter substrate;

the array substrate comprises a plurality of sub-pixel units, a first common electrode, and a second common electrode; and the color filter substrate comprises a third common electrode;

wherein the sub-pixel units comprise:
- a main sub-pixel unit comprising a first transistor and a main pixel electrode, wherein the main pixel electrode is electrically connected to a data line by the first transistor, a first storage capacitor is formed between the main pixel electrode and the first common electrode, and a first liquid crystal capacitor is formed between the main pixel electrode and the third common electrode to drive liquid crystal molecules in the liquid crystal layer to deflect; and
- a sub sub-pixel unit comprising a second transistor, a third transistor, and a sub pixel electrode, wherein the sub pixel electrode is electrically connected to the data line by the second transistor, and the second common electrode is electrically connected to the sub pixel electrode by the third transistor;

wherein the digital power management integrated chip comprises;
- a plurality of gamma pins, and the gamma pins comprise a first gamma pin, wherein the first gamma pin is a spare gamma pin of the digital power management integrated chip that is not electrically connected to the source driving circuit, and the first gamma pin is electrically connected to the second common electrode;
- a first power supply unit electrically connected to the gamma pins and configured to generate corresponding input voltages, and the first power supply unit is electrically connected to the second common electrode by the first gamma pin; and
- a fine adjustment module electrically connected between the first power supply unit and the first gamma pin, wherein the fine adjustment module has-is configured to receive a first input voltage generated by the first power supply unit, adjust the first input voltage to a first gamma voltage, and output the first gamma voltage to the first gamma pin;

wherein the first gamma pin outputs the first gamma voltage to the second common electrode wherein the first gamma voltage that is output by the fine adjustment module via the first gamma pin has a value that is relatively closer to a preset voltage for the second common electrode than the first input voltage generated by the first power supply unit.

6. The display module according to claim 5, wherein the digital power management integrated chip further comprises a plurality of common electrode pins, and the common electrode pins comprise a first common electrode pin and a second common electrode pin; and the first power supply unit is electrically connected to the first common electrode by the first common electrode pin, and the first power supply unit is electrically connected to the third common electrode by the second common electrode pin.

7. The display module according to claim 5, wherein the digital power management integrated chip further comprises:
- a second gamma pin electrically connected to the first power supply unit and outputting a second gamma voltage, wherein an absolute value of a difference between the first input voltage and the first gamma voltage is less than an absolute value of a difference between the second gamma voltage and the first gamma voltage.

8. The display module according to claim 5, wherein the circuit board is further provided with a filtering module electrically connecting the first gamma pin to the second common electrode.

9. The display module according to claim 5, wherein the digital power management integrated chip further comprises:
- a third gamma pin electrically connecting one of the first common electrode or the third common electrode to the first power supply unit.

10. The display module according to claim 5, wherein the digital power management integrated chip further comprises a second power supply unit and a voltage conversion module, and the voltage conversion module electrically connects the second power supply unit to the first gamma pin.

11. An electronic terminal, comprising the display module according to claim 5.

12. The display module according to claim 1, wherein the digital power management integrated chip further comprises a second power supply unit electrically connected to a gate driving circuit disposed in the display panel to provide a plurality of clock signals and a plurality of constant voltage signals to the gate driving circuit.

13. The display module according to claim 12, wherein the digital power management integrated chip further comprises a third power supply unit electrically connected to the source driving circuit and a timing control chip to provide a plurality of constant voltage signals to the source driving circuit and to transmit a plurality of constant voltage signals to the timing control chip, wherein the timing control chip is disposed on the circuit board.

14. The display module according to claim 10, wherein the second power supply unit is electrically connected to a gate driving circuit disposed in the display panel to provide a plurality of clock signals and a plurality of constant voltage signals to the gate driving circuit.

15. The display module according to claim 14, wherein the digital power management integrated chip further comprises a third power supply unit electrically connected to the source driving circuit and a timing control chip to provide a plurality of constant voltage signals to the source driving circuit and to transmit a plurality of constant voltage signals to the timing control chip, wherein the timing control chip is disposed on the circuit board.

16. The display module according to claim 1, wherein the preset voltage for the second common electrode is a voltage value that is required for the second common electrode to maintain normal operation of the display panel.

17. The display module according to claim 16, wherein the fine adjustment module is configured to adjust the first input voltage to the first gamma voltage such that an absolute value of a difference between the first input voltage generated by the first power supply unit and the preset voltage for the second common electrode is greater than an absolute value of a difference between the first gamma voltage output by the fine adjustment module and the preset voltage for the second common electrode.

18. The display module according to claim 5, wherein the preset voltage for the second common electrode is a voltage value that is required for the second common electrode to maintain normal operation of the display panel.

19. The display module according to claim 18, wherein the fine adjustment module is configured to adjust the first input voltage to the first gamma voltage such that an absolute value of a difference between the first input voltage generated by the first power supply unit and the preset voltage for the second common electrode is greater than an absolute value of a difference between the first gamma voltage output by the fine adjustment module and the preset voltage for the second common electrode.

\* \* \* \* \*